United States Patent
De Smet et al.

(10) Patent No.: US 10,301,990 B2
(45) Date of Patent: May 28, 2019

(54) METHODS AND SYSTEMS FOR AN EXHAUST GAS AFTERTREATMENT SYSTEM

(71) Applicant: Ford Global Technologies, LLC, Dearborn, MI (US)

(72) Inventors: Frederik De Smet, Genk (BE); Monika Angst, Aachen (DE); Christoph Boerensen, Aachen (DE); Dirk Roemer, Cologne (DE); Frank Linzen, Aachen (DE); Brendan Carberry, Aachen (DE); Felix Goebel, Aachen (DE); Evgeny Smirnov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/861,575

(22) Filed: Jan. 3, 2018

(65) Prior Publication Data

US 2018/0187583 A1   Jul. 5, 2018

(30) Foreign Application Priority Data

Jan. 5, 2017   (DE) ........................ 10 2017 200 089
Jan. 30, 2017  (DE) ........................ 10 2017 201 399

(51) Int. Cl.
*F01N 3/10* (2006.01)
*F01N 3/20* (2006.01)
(Continued)

(52) U.S. Cl.
CPC ............. *F01N 3/035* (2013.01); *B60W 20/00* (2013.01); *F01N 3/0814* (2013.01); *F01N 3/208* (2013.01); *F01N 3/2066* (2013.01); *F02D 41/0065* (2013.01); *F02M 26/05* (2016.02); *F02M 26/06* (2016.02); *F01N 3/0842* (2013.01); *F01N 2430/00* (2013.01); *F01N 2560/026* (2013.01); *F01N 2570/14* (2013.01); *F01N 2590/11* (2013.01); *F01N 2610/02* (2013.01);
(Continued)

(58) Field of Classification Search
CPC ........ F01N 3/021; F01N 3/208; F01N 3/2066; F01N 3/035; F01N 3/0814; F01N 3/0842; F01N 2900/1616; F01N 2560/021; F01N 2560/026; F01N 2610/02; F01N 2430/00; F01N 2570/14; F02D 41/0065; F02D 41/10; F02M 26/05; F02M 26/06; B60W 20/00
USPC ................... 60/274, 277, 286, 295, 299–301
See application file for complete search history.

(56) References Cited

U.S. PATENT DOCUMENTS 8,555,617 B2   10/2013  Mital
8,820,050 B2    9/2014  Dubkov et al.
(Continued)

FOREIGN PATENT DOCUMENTS

DE   102014200092 A1   7/2014
DE   202014103378 U1   8/2014
(Continued)

*Primary Examiner* — Mark A Laurenzi
*Assistant Examiner* — Dapinder Singh
(74) *Attorney, Agent, or Firm* — Julia Voutyras; McCoy Russell LLP

(57) ABSTRACT

Methods and systems are provided for an exhaust gas aftertreatment system. In one example, a method may include limiting ammonia desorption from a catalyst in response to an increase in driver demand by activating an electric motor.

15 Claims, 6 Drawing Sheets

(51) Int. Cl.
  *F02D 41/10*  (2006.01)
  *F02M 26/05*  (2016.01)
  *F01N 3/035*  (2006.01)
  *F02M 26/06*  (2016.01)
  *F01N 3/08*   (2006.01)
  *B60W 20/00*  (2016.01)
  *F02D 41/00*  (2006.01)

(52) U.S. Cl.
  CPC ...... *F01N 2900/1616* (2013.01); *F02D 41/10* (2013.01); *Y02T 10/24* (2013.01)

(56) References Cited

U.S. PATENT DOCUMENTS

| | | | |
|---|---|---|---|
| 9,464,587 B2 | 10/2016 | Hammer et al. | |
| 9,482,128 B2 | 11/2016 | Eckhoff et al. | |
| 9,587,540 B2 | 3/2017 | Eckhoff et al. | |
| 2012/0117963 A1* | 5/2012 | Hepburn | F01N 3/021 60/605.2 |
| 2012/0285143 A1 | 11/2012 | Sun et al. | |
| 2013/0000278 A1* | 1/2013 | Dubkov | F01N 3/208 60/274 |
| 2013/0118162 A1* | 5/2013 | Hepburn | F01N 3/021 60/602 |
| 2014/0000242 A1* | 1/2014 | Hepburn | F01N 3/021 60/274 |
| 2014/0013726 A1* | 1/2014 | Yacoub | F01N 3/32 60/274 |
| 2014/0165560 A1 | 6/2014 | Henry et al. | |
| 2015/0013309 A1* | 1/2015 | Upadhyay | F01N 3/208 60/274 |

FOREIGN PATENT DOCUMENTS

| | | |
|---|---|---|
| DE | 102015204093 A1 | 9/2016 |
| DE | 102015206838 A1 | 10/2016 |
| GB | 2511537 A | 9/2014 |
| JP | 2015172339 A | 10/2015 |
| WO | 2014104611 A1 | 7/2014 |

\* cited by examiner

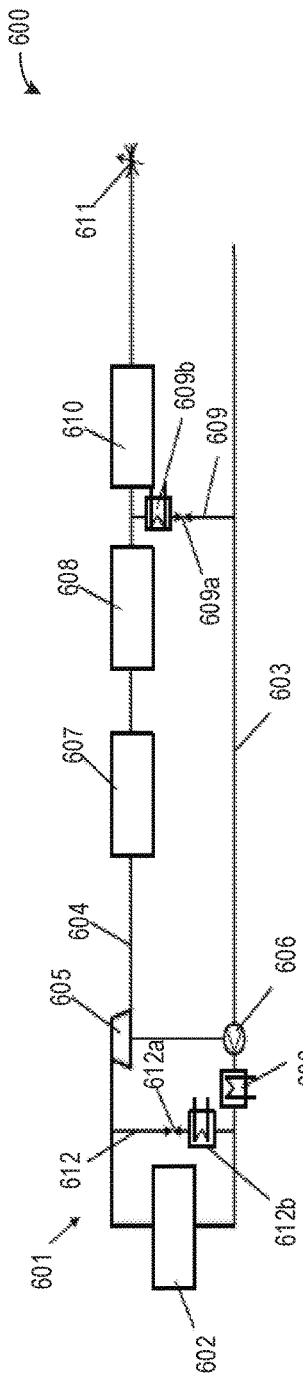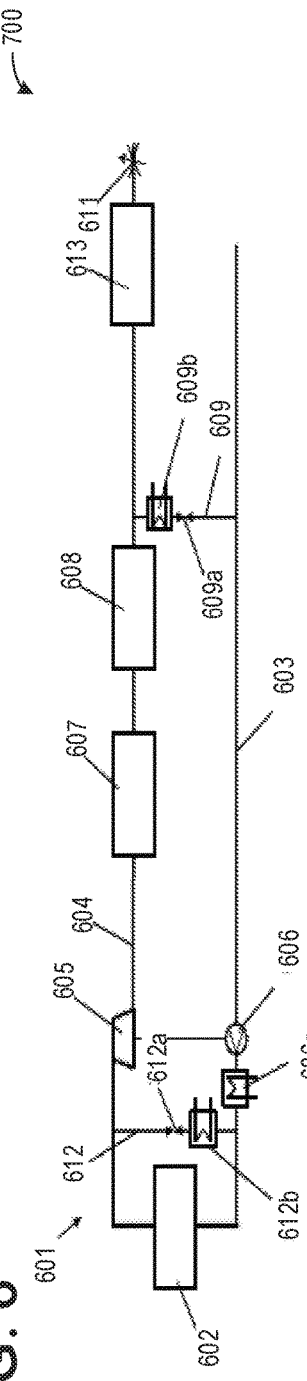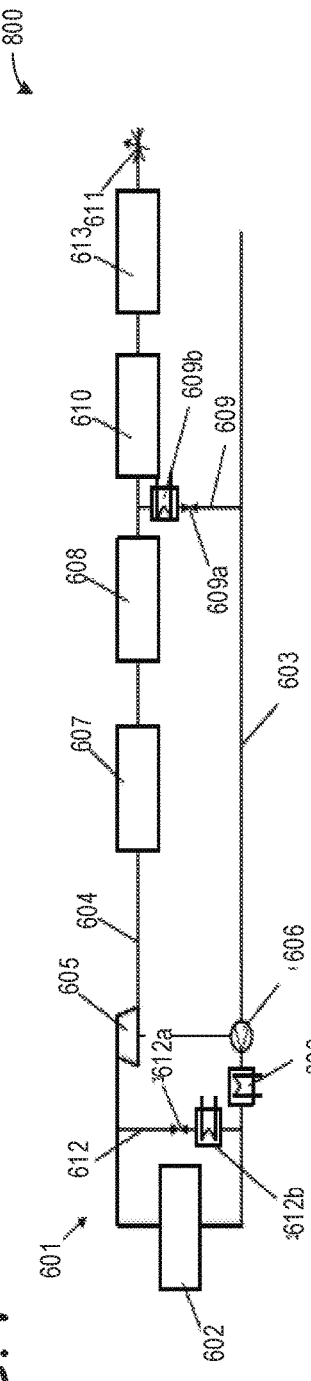

METHODS AND SYSTEMS FOR AN EXHAUST GAS AFTERTREATMENT SYSTEM

CROSS REFERENCE TO RELATED APPLICATION

The present application claims priority to German Patent Application No. 102017200089.9, filed Jan. 5, 2017 and German Patent Application No. 102017201399.0, filed Jan. 30, 2017. The entire contents of the above-referenced applications are hereby incorporated by reference in their entirety for all purposes.

FIELD

The present description relates generally to an exhaust gas aftertreatment system comprising exhaust gas recirculation (EGR) passages and ammonia storage devices.

BACKGROUND/SUMMARY

Internal combustion engines may produce considerable quantities of nitrogen oxides (NOx) during operation. In particular in diesel and Otto engines used in motor vehicles, the nitrogen oxide quantities in the exhaust gas are generally above the permissible limit values so that an exhaust gas reprocessing is demanded in order to reduce the NOx emissions. In many engines, the reduction of the nitrogen oxides is carried out by means of the non-oxidized components contained in the exhaust gas, that is to say, by carbon monoxide (CO) and non-combusted hydrocarbons (HC), using a three-way catalytic converter. In particular with diesel and Otto lean engines, as a result of the low quantities of non-oxidized exhaust gas components, however, this method is not available. In lean engines, therefore, in accordance with a widespread method there is used a NOx storage catalytic converter (referred to in abbreviated form below as LNT, Lean NOx Trap), which absorbs and stores the nitrogen oxides contained in the exhaust gas of the internal combustion engine. From time to time, a regeneration of the LNT is carried out, for which, for example, an excess of fuel is produced in the exhaust gas directed through the LNT.

However, the inventors herein have recognized potential issues with such systems. As one example, HP-EGR is activated during transient operations to meet driver demand, which may result in ammonia slip from a catalyst. While ammonia is slipping from the catalyst, LP-EGR may not flow, which may result in increased engine $NO_x$ output.

In one example, the issues described above may be addressed by a method comprising activating an electric motor and flowing low-pressure exhaust gas recirculation (LP-EGR) flow for a threshold duration in response to an ammonia slip risk of a catalyst being present, and deactivating the electric motor, shutting off LP-EGR flow, and flowing HP-EGR in response to the ammonia slip risk being present after the threshold duration. In this way, ammonia slip from the catalyst is decreased and/or prevented for at least the threshold duration of the ammonia slip risk.

As one example, the ammonia slip risk is based on an increase in driver demand, where the increase in driver demand results in engine conditions promoting desorption of ammonia stored on the catalyst. For example, the increase in driver demand may result in higher exhaust gas temperatures which may induce desorption of ammonia from the catalyst. Due to the catalyst being arranged upstream of an LP-EGR passage, desorbed ammonia may be swept to the engine when flowing LP-EGR. Thus, to prevent ammonia slip from the catalyst and limit engine $NO_x$ output, engine speed and torque may be reduced and/or maintained at current levels in response to the increase in driver demand. As such, exhaust gas conditions may remain substantially similar to exhaust gas conditions prior to the increase in driver demand.

The electric motor may remain active for the threshold duration. In one example, the threshold duration is based on a current battery state-of-charge (SOC). Thus, the battery may run out of energy once the threshold duration is complete and no longer be able to power the electric motor. In response to completion of the threshold duration, the electric motor is deactivated, and engine speed and torque are increased. Additionally, HP-EGR flows to the engine and LP-EGR is shut off to prevent ammonia from flow to the engine. In some embodiments, the catalyst may be a first selective reduction catalyst (SCR), wherein there may be arranged a second SCR downstream of the LP-EGR passage. The second SCR may capture some of the desorbed ammonia from the first SCR when an ammonia store of the second SCR is less than threshold fill store (e.g., 100% saturation of ammonia).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a first embodiment of an engine.

FIG. 7 shows a second embodiment of an engine.

FIG. 8 shows a third embodiment of an engine.

DETAILED DESCRIPTION

Figure 1:
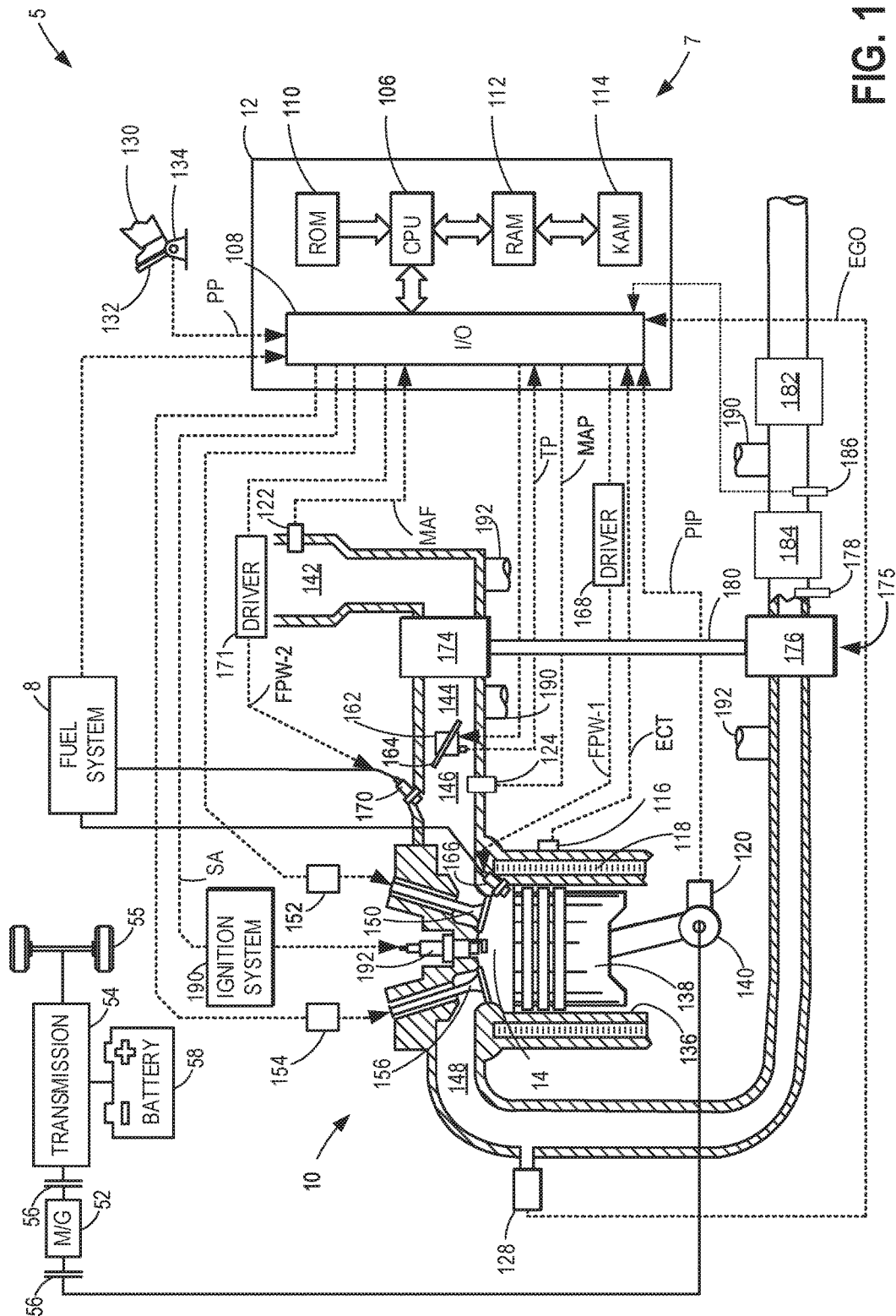
FIG. 1 shows an example of an engine of the hybrid vehicle.
Figure 2:
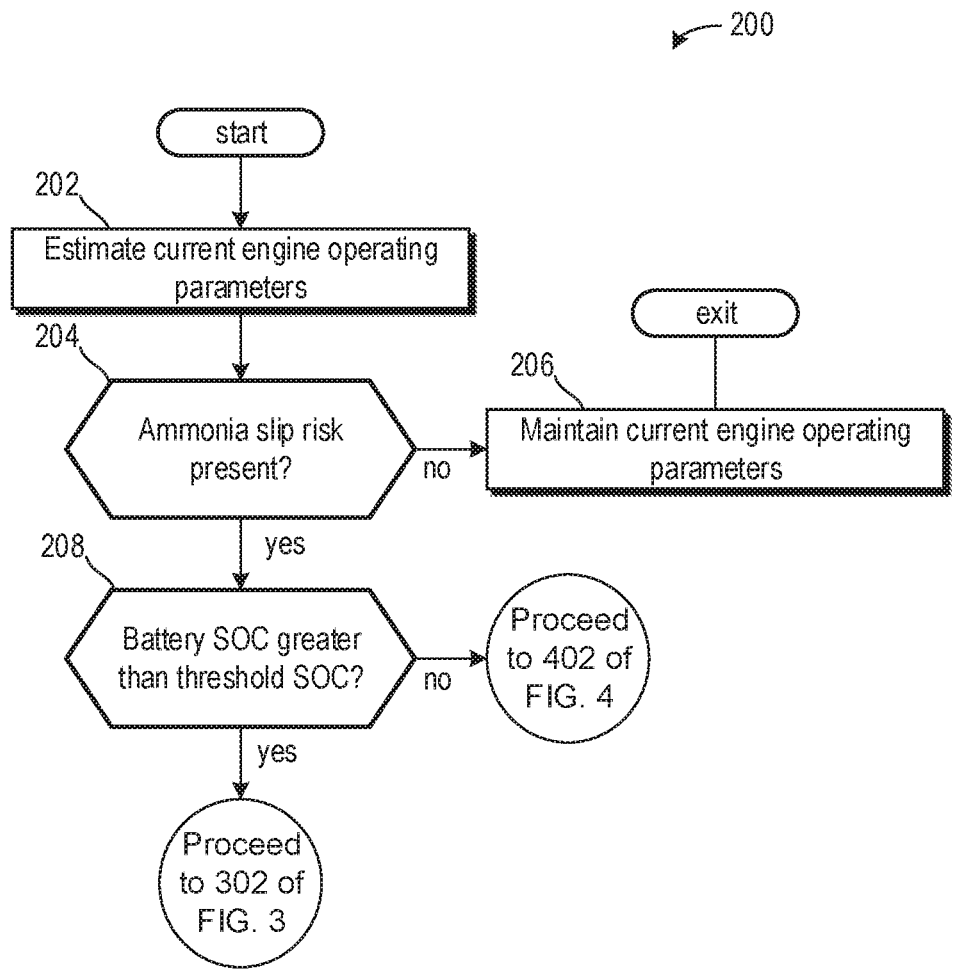
FIG. 2 shows a high level flow-chart depicting a method for determining if ammonia slip may occur.
Figure 3:
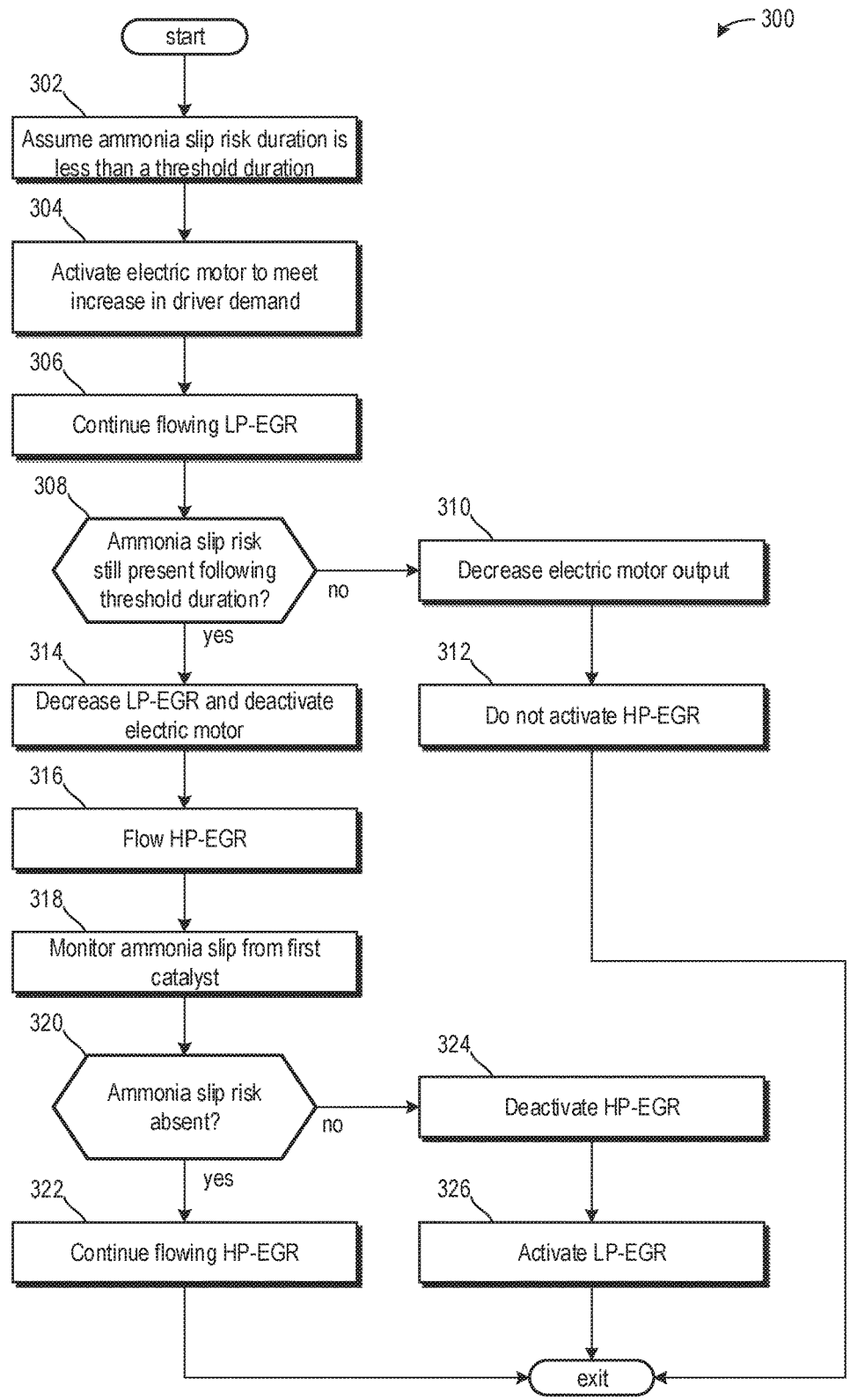
FIG. 3 shows a method for utilizing an electric motor in response to the ammonia slip.

The following description relates to systems and methods for an exhaust gas aftertreatment system. The exhaust gas aftertreatment system may be included in a hybrid vehicle, such as the hybrid vehicle of FIG. 1. First, second, and third embodiments of the engine of FIG. 1 are illustrated in FIGS. 6, 7, and 8, respectively. The electric motor of the hybrid vehicle may be used in some transient conditions where ammonia slip may occur. FIG. 2 illustrates a method for determining if sufficient battery SOC is present to operate the electric motor to limit ammonia slip. If there is sufficient battery SOC, then a method for utilizing the electric motor for a threshold duration is shown in FIG. 3. The method further includes flowing LP-EGR during the threshold duration and flowing HP-EGR after the threshold duration. Thus, ammonia slip may occur following the threshold duration.

Figure 4:
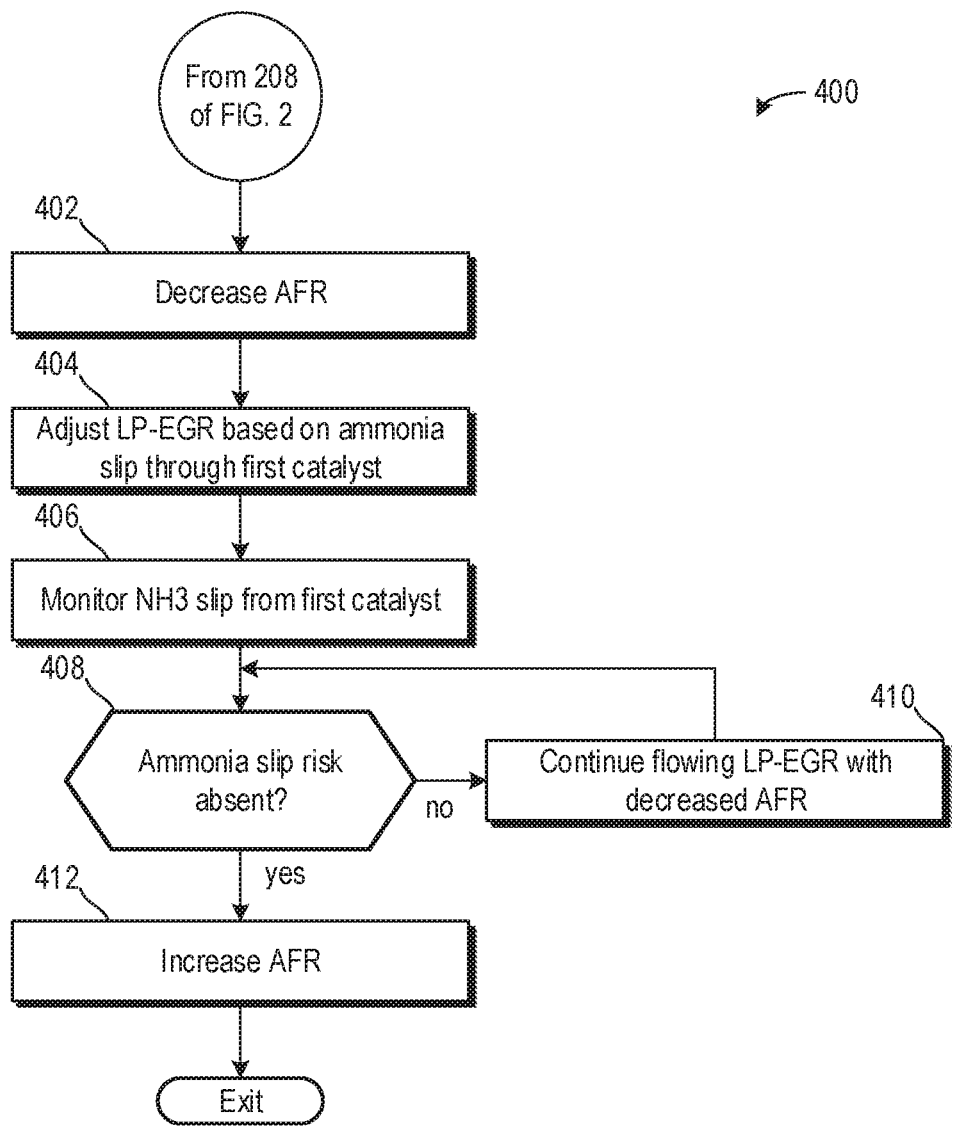
FIG. 4 shows a method for adjusting one or more engine operating parameters in response to the ammonia slip and a state of charge (SOC) of an electric motor being less than a threshold SOC.
Figure 5:
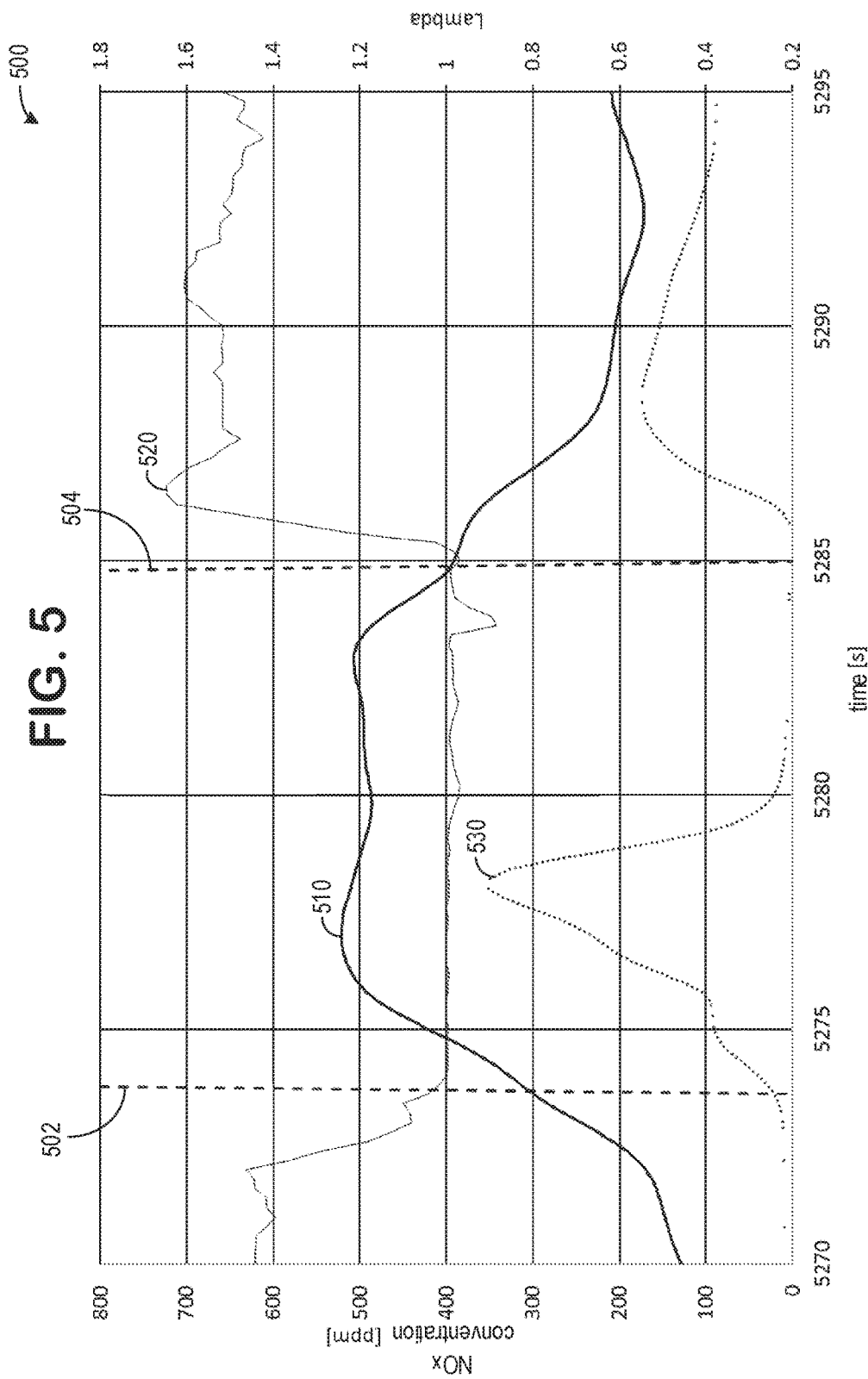
FIG. 5 shows a diagram depicting a nitrous oxide reduction over the temporal development of a substoichiometric operation.

However, if the battery SOC is insufficient and the ammonia slip risk is present, then a method comprising adjusting an engine air/fuel ratio to a richer air/fuel ratio and maintaining LP-EGR may be executed, as shown in FIG. 4. The method of FIG. 4 may be executed, additionally or alternatively, in response to an ammonia replenishment demand from a catalyst arranged downstream of the first catalyst. In such an example, ammonia replenishment demand may trump sufficient battery SOC such that ammonia is desorbed from the first catalyst in the presence of sufficient battery SOC. FIG. 5 shows a plot depicting ammonia desorption from the first catalyst based on the method of FIG. 4.

FIGS. 1 and 6-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Nitrous oxide storage catalysts (also known as lean NOx trap, LNT) may be used for temporary adsorption of nitrous oxides from the exhaust gas of internal combustion engines. In addition, they fulfil the task of oxidative aftertreatment of carbon monoxide (CO) and hydrocarbons (HC). Nitrous oxides occurring in lean mode of an internal combustion engine can be stored in an LNT; for this, the LNT oxidizes the nitrous monoxide (NO) contained in the lean exhaust gas into nitrous dioxide ($NO_2$) and then may store it in the form of nitrates. Adsorption agents which are used in the coating of the LNT may be e.g. barium oxide and/or other oxides.

The storage capacity of an LNT may be restricted amongst others by the exhaust gas temperature. Modern LNTs can store nitrous oxides in a temperature range of around 250-550° C. with varying degrees of efficiency. Furthermore, the storage capacity may be restricted by the spatial velocity of the exhaust gas. If the internal combustion engine is operated at high load, e.g. in an acceleration event, high exhaust gas temperatures and mass flows are reached which may exceed the technological limits of the LNT, so that the nitrous oxide storage efficiency of the LNT is greatly reduced because of the gas temperature and spatial velocity. Under these conditions, nitrous oxides cannot be stored in the LNT. It is possible to counter the escape of nitrous oxides at high loads if operation switches to and fro between different combustion modes depending on the engine load, the fill level of the catalyst and the exhaust gas temperature. These modes include states with lean exhaust gas and a state with rich substoichiometric exhaust gas (216-0028 and 216-0029). In particular under conditions with high load and the resulting high exhaust gas temperatures, a rich operation of the internal combustion engine is triggered. Under these conditions, the LNT no longer functions as a storage catalyst but immediately converts the nitrous oxides present in the exhaust gas into nitrogen, using the reduction agents (carbon monoxide and hydrocarbons) which are also present in the exhaust gas. In this way, under conditions of high load, advantageously nitrous oxides can be removed from the exhaust gas leaving the internal combustion engine. Also, the rich proportion in the exhaust gas may be set such that under these conditions, due to the reaction of hydrogen with nitrous oxides, ammonia is produced at the catalytically active constituents of the LNT as soon as previously stored oxygen is removed from the LNT. This ammonia may, in an advantageous embodiment, be used for further reduction of the nitrous oxides downstream using a second LNT or SCR catalyst.

When the storage capacity of the LNT is exhausted, the LNT may be regenerated. On a regeneration event (purge), rich substoichiometric exhaust gas conditions may be desired, e.g. by operating the internal combustion engine with a corresponding fuel-air mixture; here, the stored nitrous oxides are desorbed again and reduced to nitrogen on catalytically active components of the LNT, using the constituents in the rich exhaust gas (CO, HC). As well as a purge performed for regeneration, the LNT is naturally also regenerated when the exhaust gas becomes sub stoichiometric, e.g. because of a performance request from the internal combustion engine.

LNTs may comprise a temperature window in which an adequate degree of efficiency of NOx conversion can be achieved, however, the temperature window may be relatively narrow. Above a maximum LNT operating temperature, the degree of efficiency of NOx conversion is inefficient or the catalytic converter is even subjected to unintentional ageing and impairment of the catalytic converter properties.

In order to reduce nitrogen oxide even at higher exhaust gas temperatures than the maximum LNT operating temperature, SCR exhaust gas reprocessing operations, that is to say, with selective catalytic reduction (Selective Catalytic Reduction, SCR) may be utilized. SCR exhaust gas reprocessing devices are, for example, SCR catalytic converters and SCR-coated diesel particle filters, or SDPF for short.

For a SCR device, ammonia (NH3) may be added to the exhaust gas, in motor vehicle internal combustion engines in the form of an aqueous urea solution which is called AdBlue and which may evaporate after injection and is decomposed into ammonia and other substances. The ammonia is stored in the SCR exhaust gas reprocessing device and converts the nitrogen oxides contained in the exhaust gas ideally into nitrogen.

The metered urea addition may correspond to the current nitrogen oxide emission of the internal combustion engine and may therefore be carried out in accordance with the current operating conditions of the engine. If the metering is too low, an inadequate quantity of nitrogen oxide is reduced in order to comply with the pollutant limit values. If the metering is too high, excess ammonia reaches the exhaust gas which is referred to as NH3 slip.

If, at high exhaust gas temperatures, the LNT no longer operates efficiently enough, excess NOx is converted by means of urea injection in the SCR catalytic converter.

The present disclosure may be to be able to operate an internal combustion engine with an exhaust gas turbocharger and SCR exhaust gas reprocessing for as long a period of time as possible with LP-EGR without having to accept an increased ammonia slip brought about by the LP-EGR.

According to the present disclosure, a generic motor vehicle may be a hybrid electric vehicle and a second SCR exhaust gas reprocessing device may be arranged downstream of the branch to the LP-EGR passage in the exhaust gas tract, wherein ammonia for the SCR exhaust gas reprocessing is supplied or produced upstream of the branch to the low-pressure exhaust gas return.

According to the disclosure, during travel operation, at least the current ammonia load of the first SCR exhaust gas reprocessing device is continuously established and it is further verified whether the current propulsion demand for the vehicle corresponds to a combination of temperature and volume flow in the exhaust gas tract which as expected leads to ammonia desorption in the first SCR exhaust gas reprocessing device. As long as this is the case, the current combination of torque and speed of the internal combustion engine is changed using the hybrid electric drive in order to maintain the current propulsion demand in such a manner that either the operating conditions of the first SCR exhaust gas reprocessing device remain below the desorption limits or the first SCR exhaust gas reprocessing device desorbs ammonia in an accelerated manner, wherein in the meantime switching is carried out from low-pressure exhaust gas return to high-pressure exhaust gas return.

This hybrid-drive-supported strategy for SCR exhaust gas reprocessing may enable the time to be increased in which the internal combustion engine is operated with LP-EGR so that the benefits of the LP-EGR may be maintained with minimal return of ammonia to the internal combustion engine.

In an embodiment of the disclosure, if it is determined that a current driver demand corresponds to a driver demand where a combination of temperature and volume flow may lead to undesirable ammonia desorption in the first SCR exhaust gas reprocessing device, then LP-EGR may be maintained for a threshold duration during which a combination of torque and speed of the internal combustion engine are adjusted so that the operating conditions of the first SCR catalytic converter or SDPF remain below the desorption limits thereof.

Following the threshold duration, if it is still determined that the current driver demand corresponds to a combination of temperature and volume flow which may lead to undesirable ammonia desorption in the first SCR exhaust gas reprocessing device, in a preferred embodiment of the disclosure the current combination of torque and speed of the internal combustion engine is adjusted in such a manner that the ammonia which is stored in the first SCR exhaust gas reprocessing device may be desorbed more rapidly than before or as rapidly as possible. This may include adjusting EGR operation, wherein the LP-EGR is deactivated and HP-EGR is activated.

If it is determined that the current ammonia load of the first SCR exhaust gas reprocessing device falls below a lower threshold value which is dependent on temperature and volume flow, the current combination of torque and speed of the internal combustion engine may be adjusted and the EGR may be adjusted such that the HP-EGR is deactivated and the LP-EGR is reactivated.

The first SCR exhaust gas reprocessing device may be an SCR catalytic converter and/or an SDPF or the like.

Upstream of the first SCR exhaust gas reprocessing device, a urea injector or another device for supplying or producing ammonia may be arranged.

The first SCR exhaust gas reprocessing device may be an LNT or the like. In some examples, the first SCR device is a combination of a LNT and an SCR.

The second SCR exhaust gas reprocessing device is preferably an active SCR catalytic converter or contains such a unit.

In some embodiments, additionally or alternatively, a first aspect of the disclosure may comprise an arrangement of an internal combustion engine with an exhaust gas tract, from which at least one exhaust gas recirculation line of a low-pressure exhaust gas recirculation system (LP-EGR) branches off, and in which an exhaust gas aftertreatment system is arranged, wherein the exhaust gas aftertreatment system comprises at least one first nitrous oxide storage catalyst, at least one second catalytic device which is arranged downstream of the first nitrous oxide storage catalyst, at least one particulate filter which is arranged downstream of the first nitrous oxide storage catalyst, and wherein the exhaust gas recirculation line branches off downstream of the first nitrous oxide storage catalyst and upstream of the second catalytic device, and comprises at least one valve for regulating the mass of the recirculated exhaust gas, and comprises at least one temperature sensor in the region of the first nitrous oxide storage catalyst.

In some embodiments, additionally or alternatively, the arrangement according to the disclosure may allow control of the emission of nitrous oxides under all operating conditions of the internal combustion engine. The high exhaust gas temperature occurring at high load can be detected by the temperature sensor, which may be arranged in the region of the LNT, and transmitted to the control device or determined by a stored temperature model. Furthermore, in a manner known to those of ordinary skill in the art, a strong torque request can be detected and transmitted to the control device. In addition, by recirculation of exhaust gas, the LP-EGR allows advantageous control of the emissions of nitrous oxides according to current operating conditions.

In some embodiments, additionally or alternatively, the second catalytic device of the arrangement according to the disclosure is configured as a second nitrous oxide storage catalyst. By arranging the second LNT downstream of the branch of the exhaust gas recirculation line, the storage capacity of the second LNT is utilized more effectively because the exhaust gas volume flow and spatial velocity are reduced at this position in comparison with the first LNT. Also, the quantity of the reduction agent demanded during a purge may be reduced.

In some embodiments, additionally or alternatively, the first nitrous oxide storage catalyst may be arranged in the physical vicinity of the internal combustion engine such that after a cold start, it is rapidly heated to its operating temperature (e.g., a close-coupled arrangement), and the second nitrous oxide storage catalyst may be arranged physically remote from the internal combustion engine such that even exhaust gas temperatures occurring under high load allow effective storage of nitrous oxides. Thus with the arrangement according to the disclosure, the differences of arranging the first LNT close to the engine and the second LNT remote from the engine downstream of the LP-EGR circuit are fully utilized.

In some embodiments, additionally or alternatively, the second nitrous oxide storage catalyst has a catalytically active coating which differs from the catalytically active coating of the first nitrous oxide storage catalyst. Particularly preferably, the catalytically active coating of the second nitrous oxide storage catalyst, relative to the catalytically active coating of the first nitrous oxide storage catalyst, may be configured for nitrous oxide conversion at high temperatures.

In some embodiments, additionally or alternatively, in another embodiment, the second catalytic device is a catalyst for selective catalytic reduction (SCR catalyst).

In some embodiments, additionally or alternatively, both a second LNT and an SCR catalyst may be arranged in the exhaust gas tract downstream of the branch of the low-pressure exhaust gas recirculation line. Through the SCR catalyst, ammonia which may be generated in the LNT under certain circumstances during a purge, can be used to reduce the nitrous oxides, whereby the nitrous oxide reduction may be adjusted more efficiently.

In some embodiments, additionally or alternatively, a choke valve may be arranged downstream of the second catalytic device. The choke valve may advantageously be used to control the exhaust gas flow, in particular in relation to the LP-EGR.

In some embodiments, additionally or alternatively, the present disclosure may further comprise an exhaust gas recirculation line of a high-pressure exhaust gas recirculation system (HP-EGR) which branches off the exhaust gas tract upstream of the first nitrous oxide storage catalyst. Under certain operating conditions, the HP-EGR may suitably be used as an alternative or in addition to the LP-EGR.

In some embodiments, additionally or alternatively, during substoichiometric operation or on a purge, ammonia can occur in the LNT. If this is not desirable, e.g. for use in a catalyst for selective catalytic reduction, a return to the combustion chamber would lead to oxidation of the ammonia and hence to an undesirable production of additional nitrous oxides. In this case, the LP-EGR operation can be terminated and the HP-EGR used. Ideally, the quantity of supplied reduction agent is however set such that no undesirable production of ammonia occurs.

In some embodiments, additionally or alternatively, the particulate filter may comprise a catalytically active coating. The catalytically active coating is configured for selective catalytic reduction.

In some embodiments, additionally or alternatively, the present disclosure may further comprise a method for operating an arrangement according to the disclosure of an internal combustion engine with an exhaust gas tract, from which at least one exhaust gas recirculation line of a low-pressure exhaust gas recirculation system branches off, and in which at least one first nitrous oxide storage catalyst and a particulate filter are arranged upstream of the branch of the exhaust gas recirculation line, at least one temperature sensor is arranged in the physical vicinity of the first nitrous oxide storage catalyst, and at least one second catalytic device is arranged downstream of the branch of the exhaust gas recirculation line, with the steps operation of the internal combustion engine with low or medium load, switching into an operating state of the internal combustion engine with high load, starting of a rich combustion mode of the internal combustion engine, return of exhaust gas through the exhaust gas recirculation line of the low-pressure exhaust gas recirculation system, and ending of the rich operating mode and switching into an operating state of the internal combustion engine with low or medium load.

In some embodiments, additionally or alternatively, a method according to the present disclosure may adjust the emission of NOx under a plurality operating conditions of the internal combustion engine. The high exhaust gas temperature occurring at high load is detected by the temperature sensor which is advantageously arranged in the region of the LNT, and transmitted to a control device or determined by a stored temperature model. Furthermore, in the manner known to the person skilled in the art, a strong torque request may be also detected and transmitted to the control device. The control device may then trigger a substoichiometric operation of the internal combustion engine, if this is not already taking place, and generate a slightly substoichiometric, "rich" exhaust gas mixture with lambda <1.

Furthermore, the recirculation of exhaust gas may allow control of the emission of nitrous oxides according to the current operating conditions. Particularly preferably, therefore, in one embodiment of the method according to the disclosure, the quantity of recirculated exhaust gas is regulated in order to control the regeneration of the first nitrous oxide storage catalyst. Particularly preferably, therefore, an embodiment of the method according to the disclosure is used in which the quantity of recirculated exhaust gas is regulated in order to control the regeneration of the first nitrous oxide storage catalyst.

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of first catalyst 184. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example.

In one example, the first catalyst is arranged in a close-coupled position. Comparatively, this location may be upstream of a far underbody vehicle location, such as the location of a second catalyst 182. In this way, the first catalyst 184 is arranged upstream of the second catalyst. In one example, the first catalyst 184 may be a TWC, particulate filter (PF), $NO_x$ diesel oxidation catalyst, selective catalytic reduction (SCR), lean $NO_x$ trap (LNT), particulate filter (PF), the like, or combinations thereof.

A difference between the close-coupled location and the far vehicle underbody location may be include a distance from the engine, wherein the close-coupled location is closer to the engine than the far vehicle underbody location. That is to say, components in the close-coupled location are upstream of components in the far vehicle underbody location. Additionally or alternatively, exhaust gas temperatures experienced by components in the close-coupled location may be higher than temperatures experienced by components in the far vehicle underbody position. Furthermore, components in the far vehicle underbody may be larger due to fewer packaging constraints being present in an exhaust system location far away from the engine 10.

The second catalyst 182 may be arranged downstream of the first catalyst 184 and LP-EGR passage 190. The second catalyst 182 may be arranged in the far vehicle underbody. The second catalyst 182 may be a TWC, particulate filter (PF), $NO_x$ diesel oxidation catalyst, selective catalytic reduction (SCR), lean $NO_x$ trap (LNT), particulate filter (PF), the like, or combinations thereof.

An exhaust gas sensor 186 may be arranged between the first catalyst 184 and the second catalyst 182. The exhaust gas sensor 186 may provide feedback to the controller 12 regarding an amount of ammonia and/or $NO_x$ in an exhaust gas flow. In some examples, feedback from the control may be used to adjust reductant injection from an injector 178 arranged upstream of the first catalyst 184. In one example, the injector 178 is a urea injector fluidly coupled to a reservoir housing urea and is the only urea injector of the exhaust passage 148. Additional examples may include adjusting engine operating parameters in response to feedback from the exhaust gas sensor 186. For example, if the exhaust gas sensor 186 estimates the amount of ammonia and/or $NO_x$ in the exhaust gas flow to be less than a threshold and/or relatively close to zero while an ammonia slip risk is present, then the controller 12 may adjust engine operating parameters to deactivate an electric motor 52 and flow low-pressure exhaust gas recirculate (LP-EGR) through LP-EGR passage 190 by opening a valve of the LP-EGR passage. Alternatively, the electric motor 52 may remain active and high pressure (HP) EGR may flow to the engine 10 via HP-EGR passage 192. As shown, the first catalyst 184 is arranged between the HP-EGR passage 192 and the LP-EGR passage 190.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Turning now to FIG. 2, it shows a method 200 for determining conditions entering engine operating parameters comprising an ammonia slip risk. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, where the method 200 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

In some embodiments, additionally or alternatively, the method 200 may further include estimating a $NO_x$ and/or an ammonia load of the first catalyst. An exhaust gas sensor may provide feedback regarding $NO_x$ and/or $NH_3$ flow to the first catalyst. For example, the exhaust gas sensor may estimate an exhaust gas $NO_x$ concentration, wherein the exhaust gas $NO_x$ concentration may be combined with other engine operating parameters (e.g., exhaust gas temperature, current $NO_x$ load, and the like) to determine an amount of $NO_x$ being added to the first catalyst. Additionally or alternatively, the exhaust gas sensor may be positioned downstream of the first catalyst, wherein $NH_3$ flow out of the first catalyst may be related to current $NO_x$ and $NH_3$ stores thereon. For example, if $NH_3$ is leaking from the first catalyst during rich engine operating parameters, then it may be assumed that $NO_x$ stores of the first catalyst are decreasing. However, if $NH_3$ is leaking from the first catalyst during lean engine operating parameters, then $NH_3$ stores of the first catalyst may be decreasing. As such, exhaust gas sensors, specifically, $NO_x$ sensors, may not be configured to distinguish between $NO_x$ and $NH_3$.

At 204, the method 200 may include determining if an ammonia slip risk is present. An ammonia slip risk may be present if a driver demand increases. For example, if the driver demand increases as a result of a tip-in (e.g., acceleration), then exhaust gas temperatures may increase to a threshold exhaust gas temperature where the first catalyst may desorb $NH_3$ stored thereon. As such, a concentration of $NH_3$ in exhaust gas downstream of the first catalyst may increase.

Additionally or alternatively, the ammonia slip risk may be present if an air/fuel ratio is a rich air/fuel ratio (e.g., lambda less than 1.0). The excess fuel in the exhaust gas may react with $NO_x$ stored on surfaces of the first catalyst, wherein the $NO_x$ is reduced to $N_2$ and $NH_3$. As described above, $NH_3$ leakage may be undesirable due to odors produced and emissions guidelines.

If there is no ammonia slip risk, then the method 200 may proceed to 206 to maintain current engine operating parameters and does not adjust engine operating parameters in response to an ammonia slip risk.

If the method 200 determines that an ammonia slip risk is present, then the method 200 may proceed to 208 to determine if a battery state of charge (SOC) is greater than a threshold SOC. The battery SOC may be based on a remaining charge and/or energy storage of the battery 58 of FIG. 1. The threshold SOC may be based on a non-zero positive integer, in one example. The threshold SOC may be based on a battery SOC capable of executing the method 300 of FIG. 3, as will be described below. In one example, the threshold SOC is equal to 20%. If the battery SOC is greater than the threshold SOC, then the method 200 may proceed to 302 of method 300 of FIG. 3. If the battery SOC is less than the threshold SOC, then the method 200 may proceed to 402 of method 400 of FIG. 4.

The methods of FIGS. 3-4 illustrate various methods for executing in response to an ammonia slip risk through the first catalyst being present in response to an increase in driver demand. The methods may be distinguished based on a battery SOC, wherein if the battery SOC is high enough (e.g., greater than the threshold SOC), then the method 300 may be implemented which attempts to preserve an ammonia store of the first catalyst for at least a threshold duration. Following the threshold duration, the method 300 may accelerate ammonia slip from the first catalyst by deactivating an electric motor, increasing engine speed and torque, reducing LP-EGR flow to zero, maintaining an at least slightly lean (e.g., greater than lambda of 1) air/fuel ratio, and increasing HP-EGR flow. If the battery SOC is less than the threshold SOC, then the method 400 may be implemented, wherein the ammonia store of the first catalyst is reduced while maintaining LP-EGR flow to the engine. This may be accomplished by decreasing the air/fuel ratio to a lambda value of less than 1.

Additionally or alternatively, the method 400 may be initiated in response to one or more catalytic devices arranged downstream of the first catalyst demanding ammonia. That is to say, if an ammonia store of one or more devices downstream of the first catalyst is less than a threshold ammonia store, then the one or more devices may demand to ammonia replenishment. As such, this may serendipitously occur during the ammonia slip risk such that the first catalyst may replenish the ammonia stores of the downstream devices. In this way, the method 400 may be initiated when the battery SOC is greater than the threshold SOC if ammonia is demanded by devices downstream of the first catalyst.

Turning now to FIG. 3, it shows the method 300 for mitigating ammonia slip from the first catalyst for at least a threshold duration. If driver demand corresponds to engine conditions promoting ammonia slip following the threshold duration, the method 300 may adjust one or more operating parameters to increase ammonia slip from the first catalyst to decrease an amount of time in which the engine is operated without LP-EGR.

At 302, the method 300 may include assuming the ammonia slip risk duration will be less than a threshold duration. The threshold duration may be a fixed threshold (e.g., 5 seconds). Additionally or alternatively, the threshold duration may be a dynamic threshold based on one or more of driver behavior, battery SOC, degree of ammonia slip risk, and the like. For example, if the driver is an aggressive driver, wherein tip-ins and other similar driving maneuvers are relatively long, then the threshold duration may increase.

Additionally or alternatively, if the battery SOC is relatively high and/or increasing, then the threshold duration may be relatively high and/or increase. As an example, the threshold duration associated with a battery SOC of 100% may be greater than the threshold duration associated with a battery SOC of 50%.

At 304, the method may include activating an electric motor to meet the increase in driver demand. That is to say, the increase in driver demand may lead to engine conditions where the ammonia slip risk is present, as described above at FIG. 2. The method 300 may limit torque and engine speed such that these conditions may be avoided during at least the threshold duration. To supplement the difference between the increased driver demand and the current engine output, an electric motor may be activated. As such, the battery SOC may begin to decrease as the electric motor assists propelling the vehicle.

At 306, the method 300 may include continuing to flow LP-EGR. By limiting engine speed and torque, HP-EGR may not be requested, thereby allowing the engine to receive LP-EGR through the ammonia slip risk during the threshold duration. By flowing LP-EGR to the engine, $NO_x$ output may be limited.

At 308, the method 300 may include determining if the ammonia slip risk is still present following completion of the threshold duration. The ammonia risk may still be present if one or more of the conditions described at 204 of method 200 of FIG. 2 are still present. For example, if the tip-in is still occurring, then the ammonia slip risk may still be present.

If the ammonia slip risk is no longer present, then the method 300 may proceed to 310 to reduce the electric motor output. Reducing the electric motor output may include deactivating the electric motor such that battery SOC is no longer consumed to power the electric motor to meet driver demand based on the engine conditions promoting ammonia slip. In some examples, of the method 300, the electric motor output may be decreased in response to both the ammonia slip risk no longer being present and to the threshold duration being complete.

At 312, the method 300 may include not activating HP-EGR. As such, LP-EGR may remain active to limit $NO_x$ production.

Returning to 308, if the ammonia slip risk is still present following the threshold duration, then the method 300 may proceed to 314 to decrease LP-EGR and deactivate the electric motor. Decreasing LP-EGR may include adjusting an LP-EGR valve to a more closed position. In one example, the LP-EGR valve is moved to a fully closed position, thereby prevent LP-EGR from flowing to the engine.

At 316, the method 300 may include flowing HP-EGR to the engine. In this way, engine speed and torque may increase to meet the driver demand without assistance from the electric motor. By doing this, $NO_x$ output may increase relative to engine conditions where LP-EGR was flowing. Furthermore, exhaust gas temperatures may increase. By flowing HP-EGR and stopping flow of LP-EGR, the method 300 may shift from preventing ammonia slip from the first catalyst to initiating ammonia slip. The ammonia slip may be a rapid ammonia slip. That is to say, engine operating parameters including HP-EGR flow rate may be adjusted to further increase exhaust gas temperatures such that the ammonia slip may occur at a faster rate than initially estimated at determination of the presence of the ammonia slip risk. For example, adjusting engine operating parameters to increase the rate of ammonia slip risk may include retarding spark, increasing a secondary fuel injection pressure, increasing a primary fuel injection pressure, increasing HP-EGR flow, and increasing an air/fuel ratio. The secondary fuel injection pressure may occur following combustion and the primary fuel injection may occur prior to combustion. By adjusting the above described engine operating parameters, exhaust gas temperature may increase.

At 318, the method 300 may include monitoring the ammonia slip from the first catalyst. This may be based on sampling of exhaust gas via an exhaust gas sensor arranged downstream of the first catalyst as described above.

At 320, the method 300 may include determining if the ammonia slip risk is absent. The ammonia slip risk may still be present (e.g., not absent) if the driver demand still corresponds to engine conditions where ammonia risk may occur and/or if the first catalyst comprises $NH_3$ stores that have not desorbed. If the ammonia slip risk is still present, then the method may proceed to 322 to continue flowing HP-EGR to accelerate ammonia slip from the first catalyst.

The ammonia slip risk may be absent in response to one or more of driver demand decreasing and all of the ammonia from the first catalyst being desorbed. If the ammonia slip risk is absent, then the method 300 may proceed from 320 to 324 to deactivate the HP-EGR.

At 326, the method 300 may include activating LP-EGR. As such, a HP-EGR valve may be moved to a fully closed position and the LP-EGR valve may be moved to a more open position.

As an example, the methods 200 and 300 may be implemented in a vehicle on the road, wherein a driver depresses the accelerator pedal (e.g., a tip-in). The tip-in may result in an increased engine speed and torque corresponding to an ammonia slip risk. If this is the case, then method 300 may be executed if a battery SOC is greater than a threshold SOC. In response to the ammonia slip risk, engine speed and torque are maintained at conditions prior to the tip-in, wherein the increase in driver demand is met by an electric motor. As such, ammonia slip through the first catalyst may be prevented while LP-EGR flow to the engine may be maintained. This may continue for a threshold duration, where following the threshold duration, if the ammonia slip risk is still present, the engine operating parameters may be adjusted such that the ammonia slip through the first catalyst may occur faster. That is to say, an initial rate of slip may be associated with the driver demand based on the tip-in. However, by adjusting the engine operating parameters to increase the rate of ammonia slip to a rate greater than the initial rate. For example, if the initial rate decreased an ammonia store from 80% to 0% in 30 seconds, the increased rate may decrease the ammonia store from 80% to 0% in 20 seconds. By doing this, an amount of time in which HP-EGR is used in place of LP-EGR may be reduced. LP-EGR may be reactivated and flow to the engine in response to one or more the first catalyst desorbing all ammonia stored therein and the driver demand corresponding to engine conditions where ammonia slip may not occur.

Additionally or alternatively, the method 300 may further include taking into account the current ammonia load of the first catalyst which can be established by monitoring ammonia slip or by other methods known to those of ordinary skill in the art, it can be verified whether the current propulsion demand of the driver (or, in the case of an autonomous motor vehicle, of a computer program) corresponds to a combination of temperature and volume flow in the exhaust gas tract which would lead to undesirable ammonia desorption in the first catalyst (e.g., may lead to ammonia desorption).

The method may further include that the risk of ammonia desorption may exist only for a short period of time and accordingly the combination of torque and speed of the internal combustion engine may be adjusted in such a manner (which in this instance means a reduction of the torque and speed of the internal combustion engine and production of the power difference by the electric machine) that the operating conditions of the first catalyst remain below the desorption limits thereof so that the LP-EGR can be maintained without the risk of ammonia desorption. Thus, fuel economy is maintained and $NO_x$ output may not increase.

If the risk of ammonia desorption exists for a longer period of time in which the electric machine supports the internal combustion engine, the hybrid drive may reach the limit of the battery capacity (e.g., battery SOC falls below the threshold battery SOC). If this situation continues, then the ammonia slip may no longer be prevent, but rather, it may be promoted.

The combination of torque and speed of the internal combustion engine is adjusted in the other direction (which in this instance means an increase of the torque and speed of the internal combustion engine and recording of the power difference by the electric machine). The ammonia is thereby very rapidly, for example, as rapidly as possible, desorbed from the first catalyst. This ammonia slip may be supplied to a second catalyst arranged downstream of the first catalyst in the exhaust passage. As long as this lasts, the LP-EGR is closed and the internal combustion engine is operated with HP-EGR.

Varying the freedom, torque and speed of the internal combustion engine of a hybrid electric vehicle within specific limits enables the described desorption phase to be shortened. After the ammonia desorption from the first catalyst has taken place, that is to say, when the current ammonia load remains below the desorption limit for the current operating conditions, the internal combustion engine may be operated with LP-EGR again.

In some examples, additionally or alternatively, desired ammonia desorption may also be brought about when it is determined that a current ammonia load of the second catalyst is below a lower threshold value and the second catalyst is intended to be loaded with ammonia again. To address this, the ammonia slip from the first catalyst may be initiated.

Returning to 208 of method 200, if the battery SOC is below the threshold SOC, then the method 200 may transition to 402 of method 400. In this way, the battery SOC may be too low to meet an increase in driver demand with the electric motor. In some examples, additionally or alternatively, the method 200 may transition to the method 400 in response to an ammonia load of a second catalyst arranged downstream of the first catalyst being less than a threshold load. In response to the second catalyst ammonia demand and the ammonia slip risk being present, even with a battery SOC being greater than the threshold SOC, the method 200 may transition to the method 400 without proceeding to the method 300. As such, the method 400 may function to allow ammonia slip from the first catalyst while limiting engine $NO_x$ output.

Turning now to FIG. 4, it shows the method 400 for desorbing ammonia from the first catalyst and adjusting LP-EGR flow based on the desorption.

The method 400 may begin at 402, where the method 400 includes decreasing an air/fuel ratio. By decreasing an air/fuel ratio, combustion may become more rich (e.g., less lean), wherein an amount of fuel relative to an amount of air increases. The air/fuel ratio may be decreased to a slightly rich air/fuel ratio between 0.9 and 0.99 lambda. In some examples, the air/fuel ratio reduction may be higher, leading to a richer air/fuel ratio between 0.6 to 0.8 lambda. In some embodiments, the air/fuel ratio may be decreased to an air/fuel ratio between 0.65 to 0.75 lambda. In one example, the air/fuel ratio is exactly 0.75. As such, the air/fuel ratio may decrease from a slightly lean air/fuel ratio (e.g., between 1.01 and 1.1 lambda) to a rich air/fuel ratio less than 1.0 lambda.

At 404, the method 400 may include adjusting an LP-EGR flow rate based on a rate of ammonia desorption from the first catalyst. As described above, the LP-EGR passage is arranged downstream of the first catalyst. Thus, ammonia desorbed from the first catalyst may flow to the LP-EGR passage, which may deliver the ammonia to the engine, thereby increasing engine $NO_x$ output. For example, the LP-EGR flow rate may decrease as the rate of ammonia desorption increases. Alternatively, the LP-EGR flow rate may increase as the rate of ammonia desorption increases. As one example, it may be desired to increase the LP-EGR flow rate in response to the rate of ammonia desorption increasing if there is a device arranged in the LP-EGR passage configured to store ammonia. The device may be a third catalyst or the second catalyst. In one example, the third catalyst may be a particulate filter with SCR-like materials. In some embodiments, the method 400 may be implemented in a vehicle similar to the vehicle 7 of FIG. 1, wherein the second catalyst is arranged in a portion of an exhaust passage downstream of the LP-EGR passage and where the third catalyst is arranged in the LP-EGR passage. As such, desorbed ammonia from the first catalyst may be captured by each of the second and third catalysts without flowing ammonia to the engine. Thus, engine $NO_x$ output may remain relatively low due to the LP-EGR remaining active and the desorbed ammonia being captured.

In some examples, additionally or alternatively, the second catalyst may be sized such that its storage capacity is greater than a storage capacity of the first catalyst. That is to say, if the first catalyst begins the method 400 at 100% ammonia store and desorbs all the ammonia therein, the second catalyst may capture all the ammonia desorbed from the first catalyst without leaking ammonia to an ambient atmosphere. In such an example, if the ammonia store of the second catalyst is 10% beginning the method 400, its store may increase to 85% following desorption of all the ammonia from the first catalyst. Furthermore, if there is a third catalyst arranged in the LP-EGR passage, LP-EGR flow may be adjusted such that exhaust gas flows to each of the second and third catalysts may be uneven. For example, size constraints of the LP-EGR passage may result in a storage capacity of the third catalyst being less than a storage capacity of the second catalyst. Thus, to allow LP-EGR to flow as long as possible, LP-EGR flow may be adjusted such that more exhaust gas flows to the second catalyst than to the third catalyst. In one example, the LP-EGR flow is adjusted based on a combination of the ammonia desorption rate of the first catalyst, a current ammonia store of the third catalyst, exhaust gas temperature, and exhaust gas flow rate.

At 406, the method 400 may include monitoring ammonia slip from the first catalyst. By monitoring the rate of ammonia slip, the first catalyst ammonia store may be estimated.

At 408, the method 400 includes determining if the ammonia slip risk is absent. If the ammonia slip risk is not absent and the first catalyst comprises an ammonia store greater than zero, then the method may proceed to 410 to continue flowing LP-EGR and combusting with an air/fuel ratio of less than 1. If the ammonia slip risk is absent, then the method 400 may proceed to 412 to increase the air/fuel ratio to an air/fuel ratio greater than 1, which may reduce fuel consumption.

In some embodiments, additionally or alternatively, the method 400 may further include where the internal combustion engine is operated so that exhaust gas is conducted through the exhaust gas tract. The internal combustion engine is may be operated with a lean air-fuel mixture so that a lean exhaust gas is produced in response to an engine load is low to moderate.

The method 400 may switch into an operating state of the internal combustion engine with high load where ammonia slip may occur. This may occur in response to an acceleration request in which the gas pedal is depressed fully or to a substantially greater extent than in steady driving. Exhaust gas is produced with a temperature which is higher in comparison with normal operation, and at which the first LNT may no longer effectively store nitrous oxides. For example, the temperatures at high load in the region of the first LNT can rapidly rise to above 550° C., which does not allow efficient storage.

The method 400 may further include a rich combustion mode of the internal combustion engine is started. This takes place preferably by post-injection of fuel into the internal combustion engine, but may also take place by measures in the air path by reduction of the air quantity supplied.

Rich operation is maintained for the temporal duration of the high load. The internal combustion engine may be return to a lean combustion (e.g., lambda greater than 1) in response to the engine load decreasing to a mid or low load. The rich operation may however also be interrupted if e.g. during rich operation, a greater quantity of ammonia is produced than can be stored. In this case, for a specific period, a lean mode is implemented in which the ammonia previously stored is used for reduction of nitrous oxides. The two operating modes may be used alternately as long as high temperatures and spatial velocities demand it.

Turning now to FIG. 5, it shows a plot 500 illustrating an effective reduction of nitrous oxide emissions via the first catalyst by enrichment of the exhaust gas during a high load operation according to the method 400 of FIG. 4. The nitrous oxide concentration is shown over the temporal development. The period of high load and/or where ammonia slip risk is present is between vertical dashed lines 502 and 504. The nitrous oxide concentration in the exhaust gas is increased, as depicted by the thick continuous line 510 as a measure of concentration upstream of the first catalyst. Also, the enrichment set is shown as a thin continuous line 520 on the lambda curve.

It can be seen that the nitrous oxide concentration downstream of the first catalyst (dotted line 530) is reduced during rich operation. Nitrous oxides previously stored may be desorbed from the first catalyst, as can be shown by the peak of the dotted line between times 5275 and 5280. These may then be stored or converted downstream, for example, by the second catalyst. Some of these nitrous oxides are returned to the combustion chamber on use of the LP-EGR, and can again be treated by the first second. Thus the LP-EGR increases the total capacity for nitrous oxide reduction, which may also be utilized in order to configure the nitrous oxide storage component smaller and hence more cheaply for the same performance.

Turning now to FIGS. 6-8, they show various embodiments of an engine system which may be used in combination with the methods of FIGS. 2, 3, and 4.

Embodiment 600 of FIG. 6 shows an arrangement 601 comprising an internal combustion engine 602. The internal combustion engine 602 may be self-igniting or an externally ignited internal combustion engine. The internal combustion engine has at least one cylinder (not shown) but may also have a different number of cylinders, e.g. two, three, four or more cylinders. The internal combustion engine 1 may be substantially similar to engine 10 of FIG. 1.

The internal combustion engine 602 is connected to an intake tract 603 and an exhaust gas tract 604. A turbine 605 of the turbocharger is arranged in the exhaust gas tract 604. The turbine 605 is connected via a shaft to a compressor 606 arranged in the intake tract 603. Downstream of the compressor, a cooler device 606*a* is arranged in the intake tract 604. Alternatively however, no turbocharger and hence no turbine and no compressor may be present.

Downstream of the turbine 605, a first nitrous oxide storage catalyst (LNT) 607 is arranged in the exhaust gas tract 604. A particulate filter 608 is arranged downstream of the first LNT 607. If the internal combustion engine 602 is a self-igniting internal combustion engine, the particulate filter 608 is a diesel particulate filter. Ideally, the particulate filter 608 has, at least partially, a catalytically active coating. The catalytically active coating is configured for selective catalytic reduction. In this way, ammonia produced in the first LNT 607 during a substoichiometric mode is stored in the particulate filter 608 and used for reduction of nitrous oxides in the exhaust gas.

Downstream of the particulate filter 608, a low-pressure exhaust gas recirculation line 609 of a low-pressure exhaust gas recirculation system (LP-EGR) branches off the exhaust gas tract 604. This exhaust gas recirculation line 609 connects the exhaust gas tract 604 fluidically to the intake tract 603. A first exhaust gas recirculation valve 609*a* is arranged in the exhaust gas recirculation line 609 and allows control of the exhaust gas mass flow from the exhaust gas tract 604 into the intake tract 603. Furthermore, a first exhaust gas recirculation cooler 609*b* is arranged in the exhaust gas recirculation line 609. The exhaust gas recirculation cooler 609*b* may have a bypass.

A second LNT 610 is arranged downstream of the branch of the exhaust gas recirculation line 609. The second LNT 610 preferably has a different catalytically active coating from the first LNT 607. The catalytically active coating of the first LNT 607 is that of a conventional LNT. This means that the coating is optimized for absorption and conversion of nitrous oxides on cold start and moderate temperatures, wherein for the coating according to the prior art, noble metals (typically Pt, Pd or Rd), oxygen-storage materials such as cerium and barium compounds are used. The catalytically active coating of the second LNT 610 is preferably optimized differently. Since the first LNT 607 performs the tasks of cold start emission control, the second LNT 610 may be optimized, in a manner known to the expert, for NOx conversion at high temperatures. This gives the possibility of reducing the quantity of oxygen-storing components, which means that on regeneration, less stored oxygen may first be reduced, which in turn means that less fuel may be used. Optionally, the second LNT 610 may also be designed with a zoned coating in which a zone with an oxygen storage capacity is applied only at one end, in order to prevent a breakthrough of reduction agent.

A choke valve 611 is arranged downstream of the second LNT 610. The choke valve 611 serves to regulate the exhaust gas flow. In many embodiments of the arrangement 601, also no choke valve may be provided.

Upstream of the turbine 605, an exhaust gas recirculation line 612 of a high-pressure exhaust gas recirculation system branches off the exhaust tract 604, and connects the exhaust gas tract 604 fluidly to the intake tract 603. A second exhaust gas recirculation valve 612a and a second exhaust gas recirculation cooler 612b are arranged in the exhaust gas recirculation line 612. The exhaust gas recirculation cooler 612b may comprise a bypass.

Furthermore, the arrangement 601 comprises sensors (not shown), e.g. sensors for nitrous oxide, ammonia, lambda and/or temperature which may be arranged at arbitrary points in the arrangement 601. The sensors are connected to a control device (not shown). Furthermore, the arrangement 601 may for example also comprise at least one device for the introduction of reduction agent, in particular a watery urea solution, into the exhaust gas tract 604. Furthermore, a choke valve may be arranged in the downstream end region of the exhaust gas tract 604. By means of the control device, the operating modes, quantities e.g. of fuel introduced into the internal combustion engine and watery urea solution introduced into the exhaust gas tract, and the settings of valves and cooler devices can be controlled. The control device is furthermore connected to the internal combustion engine 602, in order to issue control commands concerning a rich or lean operation based on an evaluation of the measured values.

In an embodiment as depicted in FIG. 7, an embodiment 700 of the arrangement 701 has a catalyst for selective catalytic reduction (SCR catalyst) 613, which is arranged in the exhaust gas tract 604 upstream of the branch of the low-pressure exhaust gas recirculation line 609. In an embodiment according to the depiction in FIG. 8, an embodiment 800 of the arrangement 601 comprises both a second LNT 610 and an SCR catalyst 613.

In some embodiments, an arrangement of an internal combustion engine with an exhaust gas tract, from which at least one exhaust gas recirculation line of a low-pressure exhaust gas recirculation system branches off, and in which an exhaust gas aftertreatment system is arranged, wherein the exhaust gas aftertreatment system comprises at least one first nitrous oxide storage catalyst, at least one second catalytic device which is arranged downstream of the first nitrous oxide storage catalyst, at least one particulate filter which is arranged downstream of the first nitrous oxide storage catalyst, wherein the exhaust gas recirculation line branches off downstream of the first nitrous oxide storage catalyst and upstream of the second catalytic device, and comprises at least one valve for regulating the mass of the recirculated exhaust gas, and comprises at least one temperature sensor in the region of the first nitrous oxide storage catalyst. The arrangement may further include where the second catalytic device is a second nitrous oxide storage catalyst. The arrangement may further include, additionally or alternatively, the first nitrous oxide storage catalyst is arranged in the physical vicinity of the internal combustion engine such that exhaust gas temperatures occurring under high load prevent effective storage of nitrous oxides, and the second nitrous oxide storage catalyst is arranged physically remote from the internal combustion engine such that even exhaust gas temperatures occurring under high load allow effective storage of nitrous oxides.

The arrangement may further include, additionally or alternatively, where the second nitrous oxide storage catalyst has a catalytically active coating which differs from the catalytically active coating of the first nitrous oxide storage catalyst. The arrangement may further include, additionally or alternatively, where the catalytically active coating of the second nitrous oxide storage catalyst, relative to the catalytically active coating of the first nitrous oxide storage catalyst, is optimized for nitrous oxide conversion at high temperatures. The arrangement may further include, additionally or alternatively, where the second catalytic device is a catalyst for selective catalytic reduction. The arrangement may further include, additionally or alternatively, where both a second nitrous oxide storage catalyst and a catalyst for selective catalytic reduction are arranged in the exhaust gas tract downstream of the branch of the low-pressure exhaust gas recirculation line. The arrangement may further include, additionally or alternatively, where a choke valve is arranged downstream of the second catalytic device. The arrangement may further include, additionally or alternatively, where an exhaust gas recirculation line of a high-pressure exhaust gas recirculation system branches off the exhaust gas tract upstream of the first nitrous oxide storage catalyst.

A method for operating an arrangement comprising operating the internal combustion engine with low or medium load, switching into an operating state of the internal combustion engine with high load, starting of a substoichiometric combustion mode of the internal combustion engine, return of exhaust gas through the exhaust gas recirculation line of the low-pressure exhaust gas recirculation system, and ending of the substoichiometric operating mode and switching into an operating state of the internal combustion engine with low or medium load. The method further comprising where the quantity of recirculated exhaust gas is regulated in order to control the regeneration of the first nitrous oxide storage catalyst.

Additionally or alternatively, a method for operating a motor vehicle having an internal combustion engine having an exhaust gas turbocharger and a first SCR exhaust gas reprocessing device upstream of a branch to a low-pressure exhaust gas return, wherein the motor vehicle has a hybrid electric drive, downstream of the branch to the low-pressure exhaust gas return a second SCR exhaust gas reprocessing device is arranged in the exhaust gas tract, ammonia for the SCR exhaust gas reprocessing is supplied or produced upstream of the branch to the low-pressure exhaust gas return, and wherein, during travel operation, at least the current ammonia load of the first SCR exhaust gas reprocessing device is continuously established and it is further verified whether the current propulsion demand for the vehicle corresponds to a combination of temperature and volume flow in the exhaust gas tract which as expected leads to ammonia desorption in the first SCR exhaust gas reprocessing device, wherein, as long as this is the case, the current combination of speed and torque of the internal combustion engine is changed using the hybrid electric drive in order to maintain the current propulsion demand in such a manner that either the operating conditions of the first SCR exhaust gas reprocessing device remain below the desorption limits or the first SCR exhaust gas reprocessing device desorbs ammonia in an accelerated manner, wherein in the meantime switching is carried out from low-pressure exhaust gas return to high-pressure exhaust gas return.

The method may further comprise where if it is determined that the current propulsion demand corresponds to a combination of temperature and volume flow which as expected leads to undesirable ammonia desorption in the first SCR exhaust gas reprocessing device, the low-pressure exhaust gas return is maintained for a period of time during which the current combination of torque and speed of the internal combustion engine is adjusted in such a manner that the operating conditions of the first SCR catalytic converter or SDPF remain below the desorption limits thereof. The method may further comprise where when the current propulsion demand, where applicable after the predetermined period of time has elapsed, corresponds to a combination of temperature and volume flow which as expected leads to undesirable ammonia desorption in the first SCR exhaust gas reprocessing device, the current combination of speed and torque of the internal combustion engine is adjusted in such a manner that the ammonia which is stored in the first SCR exhaust gas reprocessing device is desorbed more rapidly than before or as rapidly as possible, whilst the internal combustion engine is operated with high-pressure exhaust gas return. The method may further comprise where during travel operation, the current ammonia load of the second SCR exhaust gas reprocessing device is also continuously established and compared with a lower threshold value, wherein, when the ammonia load of the second SCR exhaust gas reprocessing device is below the lower threshold value, the current combination of torque and speed of the internal combustion engine is adjusted in such a manner that ammonia which is stored in the first SCR exhaust gas reprocessing device is desorbed more rapidly than before or as rapidly as possible, whilst the internal combustion engine is operated with high-pressure exhaust gas return.

Additionally or alternatively, the method may further comprise where if it is determined that the current ammonia load of the first SCR exhaust gas reprocessing device falls below a lower threshold value, the combination of torque and speed of the internal combustion engine is reset and the internal combustion engine is operated with low-pressure exhaust gas return again. The method may further comprise, additionally or alternatively, where the motor vehicle having an internal combustion engine having an exhaust gas turbocharger and a first SCR exhaust gas reprocessing device upstream of a branch to a low-pressure exhaust gas return, the motor vehicle is a hybrid electric vehicle, downstream of the branch to the low-pressure exhaust gas return a second SCR exhaust gas reprocessing device is arranged in the exhaust gas tract, and upstream of the branch to the low-pressure exhaust gas return a device for supplying or producing ammonia for the SCR exhaust gas reprocessing is arranged. Additionally or alternatively, the first SCR exhaust gas reprocessing device comprises an SCR catalytic converter and/or an SDPF. Upstream of the first SCR exhaust gas reprocessing device a device for supplying or producing ammonia is arranged. The first SCR exhaust gas reprocessing device comprises an LNT. The second SCR exhaust gas reprocessing device comprises an active SCR catalytic converter.

In this way, a variety of methods may be implemented in response to an ammonia slip risk being present due to an increase in driver demand to either prevent ammonia slip or induce ammonia slip. If ammonia store levels of second and third catalysts downstream of the first catalyst are relatively low and ammonia replenishment is desired, then ammonia slip may be induced and/or promoted. Alternatively, if ammonia store levels of second and third catalysts downstream of the first catalyst are relatively high and ammonia replenishment is not desired and a battery SOC is above a threshold SOC, then ammonia slip may be prevented and/or reduced for at least a threshold duration. The technical effect of implementing a variety of methods to adjust ammonia slip from the first catalyst is to decrease ammonia flow to the engine, thereby decreasing engine $NO_x$ output, and to increase ammonia store efficiency of catalysts arranged in the exhaust passage.

An example of a method comprises activating an electric motor and flowing low-pressure exhaust gas recirculation (LP-EGR) flow for a threshold duration in response to an ammonia slip risk of a catalyst being present and deactivating the electric motor, shutting off LP-EGR flow, and flowing HP-EGR in response to the ammonia slip risk being present after the threshold duration. A first example of the method further includes where the ammonia slip risk is based on an increase in driver demand, where the increase in driver demand results in engine conditions promoting desorption of ammonia stored on the catalyst. A second example of the method, optionally including the first example, further includes where the catalyst is arranged upstream of a LP-EGR passage and downstream of a HP-EGR passage. A third example of the method, optionally including the first and/or second examples, further includes where the catalyst is a first selective reduction catalyst, further comprising a second selective reduction catalyst arranged downstream of the first selective reduction catalyst and the LP-EGR passage. A fourth example of the method, optionally including one or more of the first through third examples, further includes where activating the electric motor further includes decreasing engine speed and torque. A fifth example of the method, optionally including one or more of the first through fourth examples, further includes where deactivating the electric motor further includes increasing engine speed and torque and where ammonia slips from the catalyst.

An example of a system comprises an engine coupled to an exhaust passage housing a first catalyst upstream of a second catalyst relative to a direction of exhaust gas flow, a HP-EGR passage branching from the exhaust passage at a location upstream of the first catalyst and a LP-EGR passage branching from the exhaust passage at a location between the first and second catalysts, and where the LP-EGR passage houses a third catalyst, and a controller with computer-readable instructions stored on non-transitory memory thereof that when executed enable the controller to in response to an increase in driver demand corresponding to engine conditions allowing desorption of ammonia from the first catalyst activating an electric motor, flowing LP-EGR flow to the engine, and decreasing engine speed and torque for a threshold duration when a battery state-of-charge (SOC) is greater than a threshold SOC, and flowing LP-EGR and combusting rich when the battery SOC is not greater than the threshold SOC. A first example of the system further includes where the controller further comprises computer-readable instructions stored on non-transitory memory thereof that when executed enable the controller to deactivate the electric motor following the threshold duration, flow HP-EGR to the engine, and increase engine speed and torque in response to engine conditions allowing desorption of ammonia after the threshold duration, wherein the threshold duration is based on the battery SOC. A second example of the system, optionally including the first example, further includes where the controller further comprises computer-readable instructions stored on non-transitory memory thereof that when executed enable the controller to flow LP-EGR and combust rich in response to one or more of the second and third catalysts ammonia stores being less than a threshold ammonia store. A third example of the system, optionally including the first and/or second examples, further includes where the battery SOC is greater than the threshold SOC. A fourth example of the system, optionally including one or more of the first through third examples, further includes where the first catalyst is a selective reduction device, a lean $NO_x$ trap, or a combination thereof. A fifth example of the system, optionally including one or more of the first through fourth examples, further includes where the second catalyst is a selective reduction device, a lean $NO_x$ trap, or a combination thereof. A sixth example of the system, optionally including one or more of the first through fifth examples, further includes where the third catalyst is a combination of a particulate filter and a selective catalytic reduction device. A seventh example of the system, optionally including one or more of the first through sixth examples, further includes where the first catalyst is close-coupled to the engine and is in an exhaust gas environment comprising a temperature higher than a temperature of an exhaust gas environment of the second catalyst. An eighth example of the system, optionally including one or more of the first through seventh examples, further includes where the second catalyst is configured to store a greater amount of ammonia than the first and third catalysts.

An example of a method comprises flowing LP-EGR when a driver demand increases and ammonia desorbs from a first catalyst, and combusting rich in response to one or more of a second catalyst and third catalyst demanding ammonia replenishment, where the second and third catalysts are arranged downstream of the first catalyst. A first example of the method further includes where the first catalyst is arranged in a portion of an exhaust gas passage upstream from where a LP-EGR passage branches from the exhaust gas passage, and where the second catalyst is arranged downstream of the portion, and where the third catalyst is arranged in the LP-EGR passage. A second example of the method, optionally including the first example, further includes where adjusting an LP-EGR flow rate based on one or more of an ammonia desorption rate of the first catalyst, an ammonia store of the second catalyst, and an ammonia store of the third catalyst. A third example of the method, optionally including the first and/or second examples, further includes where the LP-EGR flow rate increases as the ammonia store of the second catalyst increases. A fourth example of the method, optionally including one or more of the first through third examples, further includes where the LP-EGR flow rate decreases as the ammonia store of the third catalysts increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing may not demand to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
activating an electric motor and flowing low-pressure exhaust gas recirculation (LP-EGR) flow for a threshold duration in response to an ammonia slip risk of a catalyst being present; and
deactivating the electric motor, shutting off LP-EGR flow, and flowing HP-EGR in response to the ammonia slip risk being present after the threshold duration.

2. The method of claim 1, the ammonia slip risk is based on an increase in driver demand, where the increase in driver demand results in engine conditions promoting desorption of ammonia stored on the catalyst.

3. The method of claim 1, wherein the catalyst is arranged upstream of a LP-EGR passage and downstream of a HP-EGR passage.

4. The method of claim 3, wherein the catalyst is a first selective reduction catalyst, further comprising a second selective reduction catalyst arranged downstream of the first selective reduction catalyst and the LP-EGR passage.

5. The method of claim 1, wherein activating the electric motor further includes decreasing engine speed and torque.

6. The method of claim 1, wherein deactivating the electric motor further includes increasing engine speed and torque and where ammonia slips from the catalyst.

7. A system comprising:
an engine coupled to an exhaust passage housing a first catalyst upstream of a second catalyst relative to a direction of exhaust gas flow;
a HP-EGR passage branching from the exhaust passage at a location upstream of the first catalyst and a LP-EGR passage branching from the exhaust passage at a location between the first and second catalysts, and where the LP-EGR passage houses a third catalyst; and
a controller with computer-readable instructions stored on non-transitory memory thereof that when executed enable the controller to:
in response to an increase in driver demand corresponding to engine conditions allowing desorption of ammonia from the first catalyst:
activating an electric motor, flowing LP-EGR flow to the engine, and decreasing engine speed and torque for a threshold duration when a battery state-of-charge (SOC) is greater than a threshold SOC; and
flowing LP-EGR and combusting rich when the battery SOC is not greater than the threshold SOC; and deactivating the electric motor, shutting off LP-EGR flow, and flowing HP-EGR in response to an ammonia slip risk being present after a threshold duration.

8. The system of claim 7, wherein the controller further comprises computer-readable instructions stored on non-transitory memory thereof that when executed enable the controller to:
deactivate the electric motor following the threshold duration, flow HP-EGR to the engine, and increase engine speed and torque in response to engine conditions allowing desorption of ammonia after the threshold duration, wherein the threshold duration is based on the battery SOC.

9. The system of claim 7, wherein the controller further comprises computer-readable instructions stored on non-transitory memory thereof that when executed enable the controller to:
flow LP-EGR and combust rich in response to one or more of the second and third catalysts ammonia stores being less than a threshold ammonia store.

10. The system of claim 9, wherein the battery SOC is greater than the threshold SOC.

11. The system of claim 7, wherein the first catalyst is a selective reduction device, a lean $NO_x$ trap, or a combination thereof.

12. The system of claim 7, wherein the second catalyst is a selective reduction device, a lean $NO_x$ trap, or a combination thereof.

13. The system of claim 7, wherein the third catalyst is a combination of a particulate filter and a selective catalytic reduction device.

14. The system of claim 7, wherein the first catalyst is close-coupled to the engine and is in an exhaust gas environment comprising a temperature higher than a temperature of an exhaust gas environment of the second catalyst.

15. The system of claim 7, wherein the second catalyst is configured to store a greater amount of ammonia than the first and third catalysts.

* * * * *